United States Patent

Kraus

[11] Patent Number: 5,126,560
[45] Date of Patent: Jun. 30, 1992

[54] GRADUATION CARRIER OF PLASTICS MATERIAL WITH A GRADUATION STRUCTURE AND FRESNEL ZONE RING

[75] Inventor: Heinz Kraus, Traunreut, Fed. Rep. of Germany

[73] Assignee: Dr. Johannes Heidenhain GmbH, Traunreut, Fed. Rep. of Germany

[21] Appl. No.: 596,466

[22] Filed: Oct. 12, 1990

[30] Foreign Application Priority Data

Oct. 14, 1989 [DE] Fed. Rep. of Germany ....... 3934339

[51] Int. Cl.$^5$ .............................................. H01J 31/50
[52] U.S. Cl. ............................ 250/231.13; 250/231.14
[58] Field of Search ..................... 250/231.13, 231.14, 250/231.16, 231.18, 237 G; 33/707

[56] References Cited

U.S. PATENT DOCUMENTS

| 4,297,573 | 10/1981 | Becchi et al. | 250/231.16 |
| 4,673,808 | 6/1987 | Katohno et al. | 250/231.13 |
| 4,686,362 | 8/1987 | Merlo | 250/231.14 |
| 4,740,691 | 4/1988 | Ushiyama | 250/231.18 |
| 4,780,610 | 10/1988 | Abe | 250/231.1 |
| 4,806,751 | 2/1989 | Abe et al. | 250/231.13 |
| 4,942,295 | 7/1990 | Brunner et al. | 250/231.13 |

Primary Examiner—David C. Nelms
Assistant Examiner—Michael Messinger
Attorney, Agent, or Firm—Toren, McGeady & Associates

[57] ABSTRACT

A graduation carrier of plastics material with a graduation structure, particularly for a photoelectric position measuring device. The graduation structure is a specially prefabricated lamina which is integrated with the graduation carrier with positive engagement. The free surface of the graduation structure and the free surface of the graduation carrier are located in a plane.

1 Claim, 3 Drawing Sheets

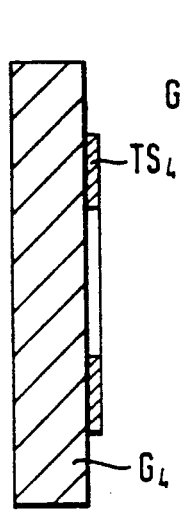
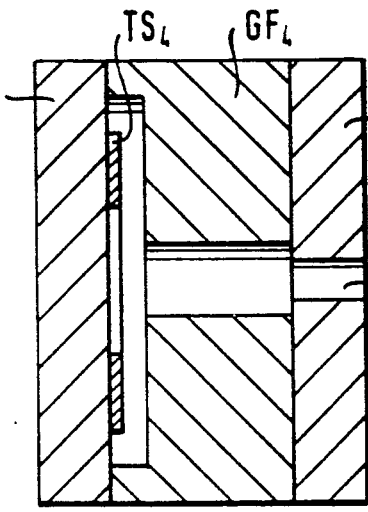
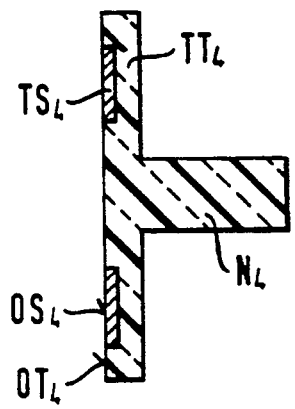
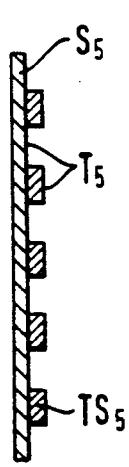
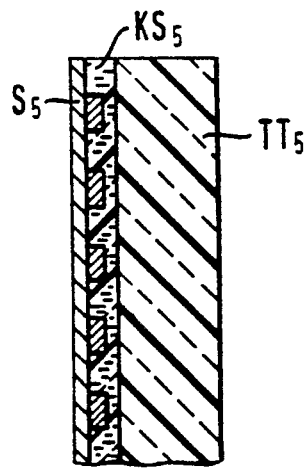
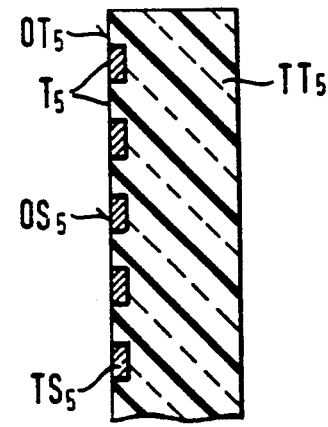

GRADUATION CARRIER OF PLASTICS MATERIAL WITH A GRADUATION STRUCTURE AND FRESNEL ZONE RING

BACKGROUND OF THE INVENTION

1. Field of the Invention

The present invention relates to a graduation carrier of plastics material with a graduation structure, particularly for a photoelectric position measuring device.

2. Description of the Related Art

A position measuring device of the above-described type is used for measuring the relative position of two objects which are movable relative to each other, for example, two machine components of a machine tool for positioning a tool relative to a workpiece to be processed. For this process, one of the objects is connected to the graduation carrier whose graduation structure is scanned by a scanning unit connected to the other object.

U.S. Pat. No. 4,806,751 discloses an angle-measuring device with a circular graduation carrier of plastics material. The graduation carrier includes a hub and a graduation structure in the form of a metal disk with recesses which is glued with the center portion thereof to the hub. In the outer portion with the recesses, the graduation carrier and the metal disk are spaced apart from each other. This graduation carrier with the only coarse graduation structure is relatively complicated with respect to construction and manufacture.

SUMMARY OF THE INVENTION

It is, therefore, the primary object of the present invention to substantially simplify the construction and manufacture of a graduation carrier of plastics material with a graduation structure.

In accordance with the present invention, the graduation structure is a separately prefabricated lamina or sheet which is integrated on the graduation carrier with positive engagement.

The present invention provides the particular advantages that the integration with positive engagement of the graduation structure in the graduation carrier of plastics material substantially simplifies and, thus, makes less expensive the construction and the manufacture by means of a casting method or an injection molding method. The manufacture is particularly inexpensive when multiple-purpose casting molds are used. The optical characteristics (absorption, reflectiveness) of the graduation structure can be varied in many ways. Depending on the construction, graduation structures with a resolution to the submicron range can be obtained.

The various features of novelty which characterize the invention are pointed out with particularity in the claims annexed to and forming a part of this disclosure. For a better understanding of the invention, its operating advantages attained by its use, reference should be had to the drawing and descriptive matter in which there are illustrated and described preferred embodiments of the invention.

BRIEF DESCRIPTION OF THE DRAWING

In the drawing:

FIGS. 4a, 4b, and 4c show the manufacturing steps of a fourth embodiment of the graduation carrier with graduation structure; and FIGS. 5a, 5b, and 5c show the manufacturing steps of a fifth embodiment of the graduation carrier with graduation structure.

DESCRIPTION OF THE PREFERRED EMBODIMENTS

Figure 1A:
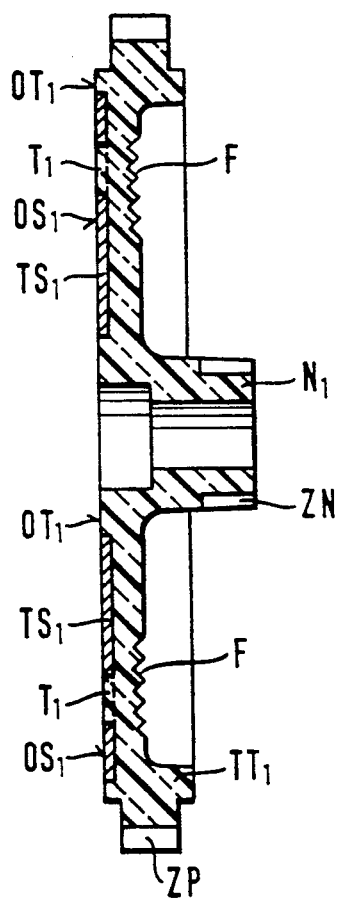
FIG. 1a is a cross-sectional view of a first embodiment of the graduation carrier with a graduation structure according to the present invention.
Figure 1B:
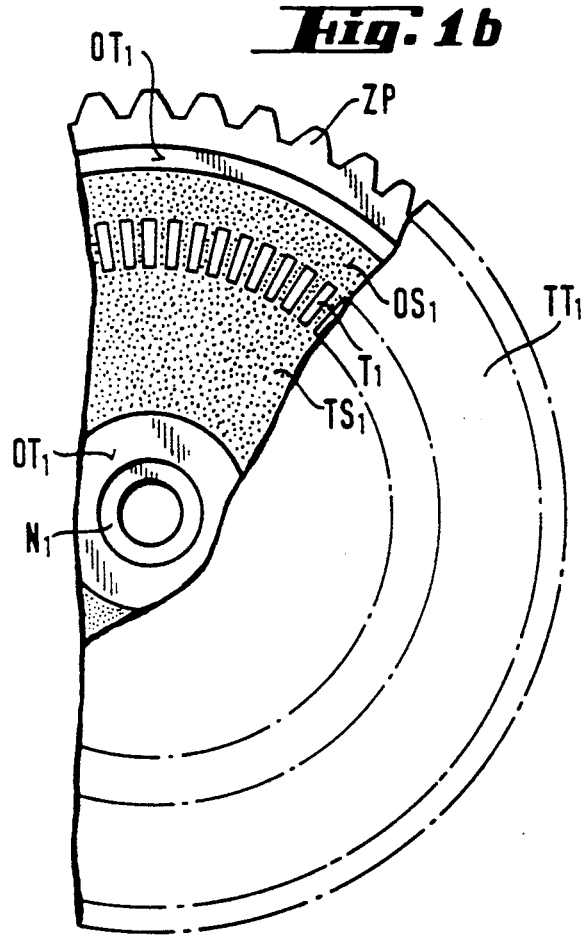
FIG. 1b is a plan view of the graduation carrier with graduation structure of FIG. 1.

FIG. 1a of the drawing is a cross-sectional view of a first embodiment of a circular graduation carrier $TT_1$ of plastics material with a hollow hub $N_1$ which is integrally cast with the graduation carrier. In FIG. 1b, the graduation carrier is shown in a plan view. A graduation structure $TS_1$ in the form of a separately prefabricated lamina is integrated with positive engagement on the free surface $OT_1$ of the graduation carrier $TT_1$. The free surface $OT_1$ of the graduation $TT_1$ and the free surface $OS_1$ of the graduation structure $TS_1$ are located in a plane. The graduation structure $TS_1$ has an incremental or absolute graduation $T_1$ which, in the conventional manner, is composed of light-permeable graduation lines and light-impermeable graduation lines.

The graduation carrier $TT_1$ with the graduation structure $TS_1$ is used, for example, in a photoelectric angle-measuring device for measuring the relative position of two objects which are movable relative to each other, for example, a carriage relative to the bed of a processing machine, not shown. For this purpose, the hollow hub $N_1$ of the graduation carrier $TT_1$ is connected to an adjusting spindle for the carriage and a scanning unit, not shown, of the angle-measuring device connected to the head scans the incremental or absolute graduation $T_1$ either in transmitted light or in incident light in order to obtain measurement values for the relative positions of the two objects. On the surface of the transparent graduation carrier $TT_1$ opposite the incremental graduation $T_1$, an optically effective structure, for example, in the form of a Fresnel zone ring F, may be provided. In addition to the hub $N_1$ and the Fresnel zone ring F, other functional elements provided are a toothing ZN on the hub $N_1$ and a toothing ZP on the periphery of the graduation carrier $TT_1$.

Figures 2A, 2B:
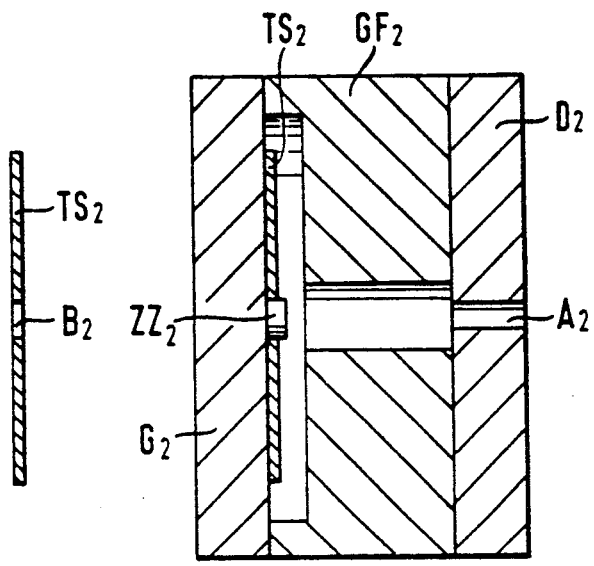
FIGS. 2a, 2b, and 2c show the manufacturing steps of a second embodiment of the graduation carrier with graduation structure.
Figure 2C:
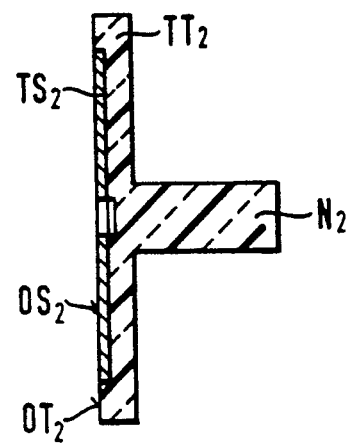

FIG. 2 shows in sectional views from left to right the manufacturing steps of a second embodiment of the circular graduation carrier $TT_2$ of plastics material with a graduation structure $TS_2$. The graduation structure $TS_2$ shown on the left of FIG. 2 is an especially prefabricated lamina in the form of a shaped etched component. The graduation structure $TS_2$ has a center bore $B_2$ and, as shown in the middle of FIG. 2, is concentrically placed on a base plate $G_2$ of a casting mold $GF_2$ by means of a centering pin $ZZ_2$. Liquid transparent plastics material for die casting is supplied through a sprue bore $A_2$ in the cover $D_2$ of the casting mold $GF_2$. After the plastics material has hardened, the base plate $G_2$ is removed and the finished graduation carrier $TT_2$ of plastics material with the graduation structure $TS_2$ and an integrally cast hub $N_2$ are removed, as can be seen on the right in FIG. 2. The graduation structure $TS_2$ is now integrated in the graduation carrier $TT_2$ with positive engagement and positionally stable. The surface $OS_2$ of the graduation structure $TS_2$ and the surface $OT_2$ of the graduation carrier $TT_2$ are located in a plane.

Figures 3A, 3B:
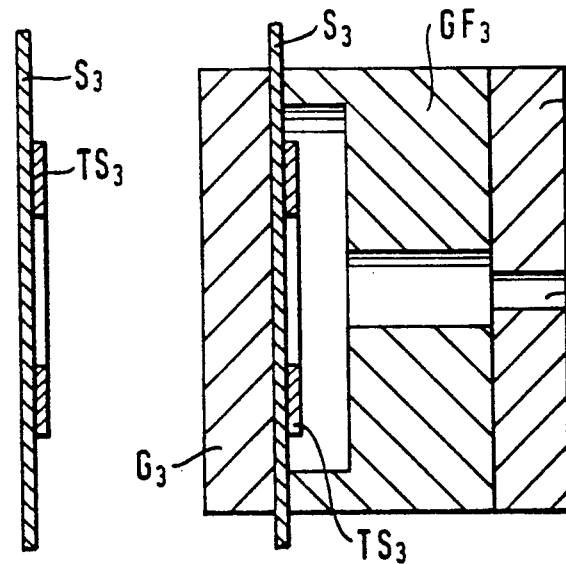
FIGS. 3a, 3b, and 3c show the manufacturing steps of a third embodiment of the graduation carrier with graduation structure.
Figure 3C:
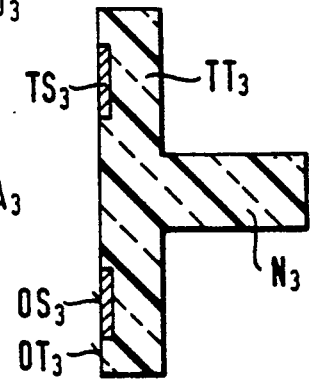

FIG. 3 shows in sectional views from left to right the manufacturing steps of a third embodiment of the circular graduation carrier $TT_3$ of plastics material with a graduation structure $TS_3$. As shown on the left of FIG. 2, the graduation structure $TS_3$ which is especially prefabricated as a lamina in the form of a nickel galvanic member is placed on a steel sheet $S_3$. The graduation structure $TT_3$ is concentrically arranged on a base plate $G_3$ of a casting mold $GF_3$. Centering is effected outside of the casting mold $GF_3$ in a manner which is not illustrated. Liquid transparent plastics material for die casting is supplied through a sprue bore $A_3$ in the cover $D_3$ of the casting mold $GF_3$, as shown in the middle of FIG. 3. After the plastics material has hardened, the base plate $G_3$ is removed and the finished graduation carrier $TT_3$ of plastics material with the graduation structure $TS_3$ and an integrally cast hub $N_3$ are removed. Subsequently, as shown on the right in FIG. 3, the steel sheet $S_3$ is pulled off. The graduation structure $TS_3$ is now integrated in the graduation $TT_3$ with positive engagement and positionally stable. The surface $OS_3$ of the graduation structure $TS_3$ and the surface $OT_3$ of the graduation carrier $TT_3$ are located in a plane.

FIG. 4 shows in sectional views from left to right the manufacturing steps of a fourth embodiment of the circular graduation carrier $TT_4$ of plastics material with a graduation structure $TS_4$. The graduation structure $TS_4$ which is a lamina in the form of a gold galvanic member, is especially prefabricated and placed on a base plate $G_4$ of a casting mold $GF_4$, as shown on the left in FIG. 4. Subsequently, the base plate $G_4$ is fastened to the casting mold $GF_4$, so that the graduation structure $TS_4$ is in a concentric position. Liquid transparent plastics material for die casting is supplied through a sprue bore $A_4$ through the cover $D_4$ of the casting mold $GF_4$, as illustrated in the middle of FIG. 4. After the plastics material has hardened, the base plate $G_4$ and the finished graduation $TT_4$ of plastics material with the graduation structure $TS_4$ and an integrally cast hub $N_4$ is pulled off from the base plate $G_4$, as can be seen on the right in FIG. 4. The graduation structure $TS_4$ is now integrated in the graduation carrier $TT_4$ with positive engagement and positionally stable. The surface $OS_4$ of the graduation structure $TS_4$ and the surface $OT_4$ of the graduation carrier $TT_4$ are located in a plane.

FIG. 5 shows in sectional views from left to right the manufacturing steps of a fifth embodiment of the graduation carrier $TT_5$ of plastics material with a graduation structure $TS_5$. In this embodiment, the graduation carrier $TT_5$ is rod-shaped. As shown on the left in FIG. 5, a graduation structure $TS_5$ with a graduation $T_5$ is especially prefabricated as a lamina and mounted on a steel sheet $S_5$. As shown in the middle of FIG. 5, a hardenable plastics material layer $KS_5$ is applied on a surface of the prefabricated graduation carrier $TT_5$ of plastics material. The graduation structure $TS_5$ is placed on the graduation carrier $TT_5$. As shown on the right in FIG. 5, after the plastics material layer $KS_5$ has hardened in a die casting mold, not shown, the steel sheet $S_5$ is pulled off. The graduation structure $TS_5$ with a graduation $T_5$ is now integrated in the graduation carrier $TT_5$ with positive engagement and positionally stable. The surface $OS_5$ of the graduation structure $TS_5$ and the surface $OT_5$ of the graduation carrier $TT_5$ are located in a plane. After hardening, a boundary surface no longer exists between the plastics material $KS_5$ and the graduation carrier $TT_5$. This rod-shaped graduation carrier $TT_5$ with the graduation structure $TS_5$ is used in a length-measuring device, not shown.

The graduation structure $TS_1$ may also be a stamped metal part or a member which is perforated by melting by means of a laser ray.

While specific embodiments of the invention have been shown and described in detail to illustrate the inventive principles, it will be understood that the invention may be embodied otherwise without departing from such principles.

I claim:

1. In a graduation carrier of plastic material with a graduation structure, particularly for a photoelectric position-measuring device, the improvement comprising the graduation structure being an especially prefabricated lamina which is integrated on the graduation carrier with positive engagement, the graduation structure and the graduation carrier having free surfaces, the free surfaces of the graduation structure and of the graduation carrier being located in a plane, a hub being integrally cast to the graduation carrier, the graduation carrier being circular, the hub being provided with a toothing, the graduation carrier having a circular periphery, the graduation carrier further comprising a toothing on the periphery, wherein an optically effective structure is formed in the graduation carrier, and wherein the optically effective structure is a Fresnel zone ring.

* * * * *